J. D. BEHRENS.
WHEEL.
APPLICATION FILED MAY 3, 1907.
905,833.
Patented Dec. 8, 1908.
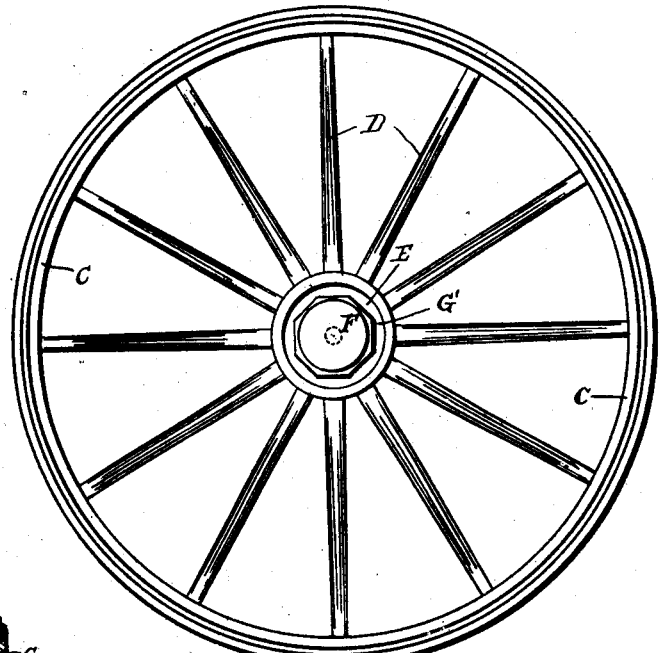
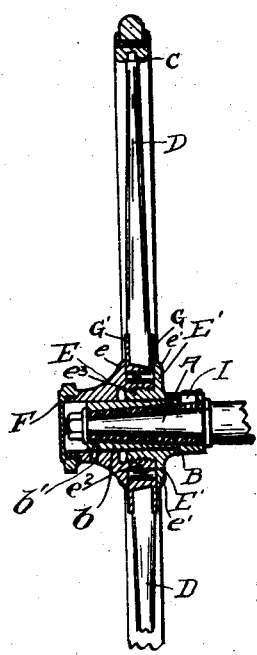
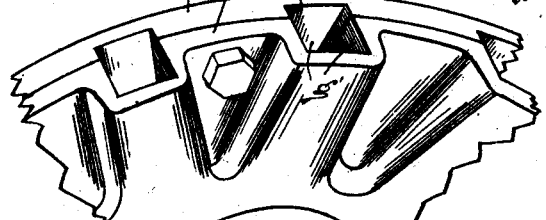
Fig. 1.
Fig. 2.
Fig. 3.
Fig. 4.
Witnesses
C. M. Fahnestock
Agnes B. Grant.
Inventor
John D. Behrens,
By George B. Cortinan,
his Attorney

UNITED STATES PATENT OFFICE.

JOHN D. BEHRENS, OF CINCINNATI, OHIO.

WHEEL.

No. 905,833.   Specification of Letters Patent.   Patented Dec. 8, 1908.

Application filed May 3, 1907. Serial No. 371,673.

*To all whom it may concern:*

Be it known that I, JOHN D. BEHRENS, a citizen of the United States, residing at Cincinnati, in the county of Hamilton and State of Ohio, have invented certain new and useful Improvements in Wheels, of which the following is a specification.

The objects of my invention are to provide a wheel by means of which the draft of carriages, trucks, or other vehicles, may be lessened; to provide a wheel in which spokes may be reset without removing the tire or fellies, and to provide a durable wheel of simple and economic constructions.

My invention consists in the parts and combination and arrangement of parts hereinafter described and claimed.

In the drawings Figure 1 is a side view of the wheel from the outer side; Fig. 2 a vertical sectional view longitudinally of the hub; Fig. 3 a transverse sectional view of the hub, and Fig. 4 an isometric view of a section of a two part foot ring for the spokes.

A represents a vehicle axle, B the axle box, $b$ the ordinary wooden sleeve of the box, and $b^1$ a screw hole for attaching the wooden sleeve to the iron sleeve of the box, C the felly and D, D, the spokes all of which may be of any usual or desired type; E represents an outer hub section consisting of a hollow shell provided with an annular flange $e$ adjacent to the spoke zone and having a threaded axial extension $e^2$ adapted to engage with a corresponding extension $e^3$ on the inner hub section E′, and preferably threaded at its outer end to receive a hub cap F. The inner hub section also consists of a hollow shell having an annular flange $e'$ adjacent to the spoke zone. These hub sections are adapted to receive the axle box, and when in place leave an annular channel between the flanges and the outer of the axial extensions, or hub center.

G and G′ represent the sections of a two part foot ring for the spokes. These parts are provided respectively with partial mortises $g$ and $g'$ arranged to register, and forming, when the two parts of the ring are brought together, the spoke mortises. The foot ring is adapted to encircle the hub center. Its inner periphery is larger than the outer periphery of the hub center thus leaving an annular space adapted to receive a plurality of rollers H or other anti friction bearing or bearings. The axle box is preferably provided with a capped lubricating chamber I adjacent to the inner edge of the hub.

The spokes are preferably first secured in the fellies, their feet then placed in the mortise elements of one of the foot ring parts the outer ring part applied and detachably secured to its mate by screws or otherwise and the ring placed over the outer axial extension of the hub. The rollers are then placed in position in the annular space between the foot ring and the hub center, and the hub sections united by means of the screw threads.

It will be noted that the hub is adapted to rotate on the axle in the usual way, and that the rim spokes and foot ring constitute a wheel which is rotatable upon the friction rollers independently from or concurrently with its rotation upon the axle. This arrangement serves to lessen the friction, and consequent draft, and the liability to hot boxes. In case a box should become overheated the wheel will still rotate upon the anti friction bearing with less friction than upon the ordinary axle spindle.

If a spoke should be injured it may be readily removed and another inserted, without removing the tire or rim, by disconnecting the sections of the hub and foot ring.

By placing the lubricating chamber above the heel of the axle spindle, the lubricant follows the taper of the spindle and complete lubrication is secured.

I claim as my invention.

1. The combination in a wheel, of a two part hub, the hub sections being detachably secured to each other and adapted to rotate upon an axle; a spoke foot ring adapted to rotate relatively to the hub sections; and anti-friction bearings between the spoke foot ring and the hub sections, substantially as and for the purpose specified.

2. The combination, in a wheel, of hub sections secured to each other and provided with annular flanges adjacent to the spoke zone and an axial extension taking through the spoke zone, with a spoke foot ring encircling the axial extension and adapted to rotate thereon, the ring consisting of sections secured to each other and provided with mortise elements adapted to embrace the spoke tenons, substantially as and for the purpose specified.

3. The combination, in a wheel, of hub sections secured to each other and provided with annular flanges adjacent to the spoke zone and an axial extension taking through the spoke zone, with a spoke foot ring encircling the axial extension and adapted to rotate thereon, the ring consisting of sections detachably secured to each other and provided with mortise elements adapted to embrace the spoke tenons, substantially as and for the purpose specified.

4. The combination, in a wheel, of hub sections secured to each other and provided with annular flanges adjacent to the spoke zone and an axial extension taking through the spoke zone, a spoke foot ring encircling the axial extension, the ring consisting of sections secured to each other and provided with mortise elements adapted to embrace the spoke tenons, and anti-friction bearings between the spoke foot ring and the axial extension, substantially as and for the purpose specified.

5. The combination, in a wheel, of hub sections detachably secured to each other and provided with annular flanges adjacent to the spoke zone and an axial extension taking through the spoke zone; a spoke foot ring encircling the axial extension, the ring consisting of sections detachably secured to each other and provided with mortise elements adapted to embrace the spoke tenons, and anti-friction bearings between the spoke foot ring and the axial extension, substantially as and for the purpose specified.

6. The combination, in a wheel, of hub sections E and E' carrying the axle box; a spoke foot ring consisting of sections G and G' encircling the hub center and adapted to rotate relatively thereto; roller bearings H arranged between the spoke foot ring, and the hub center, and the lubricating chamber I above the heel of the axle spindle, substantially as and for the purpose specified.

JOHN D. BEHRENS.

Witnesses:
GEO. B. PARKINSON,
AGNES B. GRANT.